US011005844B2

(12) United States Patent
Wang et al.

(10) Patent No.: US 11,005,844 B2
(45) Date of Patent: May 11, 2021

(54) BLOCKCHAIN-BASED SMART CONTRACT CALL METHODS AND APPARATUS, AND ELECTRONIC DEVICE

(71) Applicant: Advanced New Technologies Co., Ltd., Grand Cayman (KY)

(72) Inventors: Jiyuan Wang, Hangzhou (CN); Xuebing Yan, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/456,227

(22) Filed: Jun. 28, 2019

(65) Prior Publication Data

US 2020/0007544 A1    Jan. 2, 2020

(30) Foreign Application Priority Data

Jun. 29, 2018 (CN) .......................... 201810713426.X

(51) Int. Cl.
*H04L 29/06* (2006.01)
*H04L 9/32* (2006.01)
*G06F 16/27* (2019.01)
*H04L 9/06* (2006.01)

(52) U.S. Cl.
CPC .............. *H04L 63/10* (2013.01); *G06F 16/27* (2019.01); *H04L 9/0637* (2013.01); *H04L 9/3247* (2013.01); *H04L 2209/38* (2013.01)

(58) Field of Classification Search
CPC . H04L 9/0637; H04L 9/3247; H04L 2209/38; H04L 2209/56; H04L 63/10; G06Q 2220/00; G06F 16/27
See application file for complete search history.

(56) References Cited

U.S. PATENT DOCUMENTS

| 10,146,792 | B1* | 12/2018 | Dobrek | G06Q 20/3829 |
| 2007/0168301 | A1 | 7/2007 | Eisner et al. | |
| 2016/0379213 | A1* | 12/2016 | Isaacson | G06Q 20/12 705/44 |
| 2017/0287068 | A1* | 10/2017 | Nugent | G06Q 20/065 |

(Continued)

FOREIGN PATENT DOCUMENTS

| CN | 101751643 | 6/2010 |
| CN | 201707689 | 1/2011 |

(Continued)

OTHER PUBLICATIONS

PCT International Search Report and Written Opinion in International Application No. PCTUS2019039491, dated Sep. 18, 2019, 14 pages.

(Continued)

*Primary Examiner* — Jeremy S Duffield
(74) *Attorney, Agent, or Firm* — Fish & Richardson P.C.

(57) ABSTRACT

This specification describes techniques for blockchain-based smart contract call. One example method includes receiving a target transaction initiated by a client device of a blockchain, wherein the target transaction is preconfigured for a call rule used to initiate a call for a smart contract; obtaining the call rule preconfigured for the target transaction; executing the call rule to initiate a call for a target smart contract; and providing a call result to the client device when the call for the target smart contract is completed.

11 Claims, 7 Drawing Sheets

(56) References Cited

U.S. PATENT DOCUMENTS

| | | | |
|---|---|---|---|
| 2018/0089256 A1* | 3/2018 | Wright, Sr. | G06F 16/1824 |
| 2018/0097779 A1 | 4/2018 | Karame et al. | |
| 2019/0123895 A1* | 4/2019 | Blake | H04L 63/0442 |
| 2019/0179821 A1* | 6/2019 | Fan | G06F 21/604 |
| 2019/0188063 A1* | 6/2019 | McKellar | G06F 9/548 |
| 2019/0238525 A1* | 8/2019 | Padmanabhan | G06F 21/6245 |
| 2020/0067697 A1* | 2/2020 | Puddu | H04L 9/0637 |

FOREIGN PATENT DOCUMENTS

| | | |
|---|---|---|
| CN | 106537344 | 3/2017 |
| CN | 107193672 | 9/2017 |
| CN | 107392619 | 11/2017 |
| CN | 107395674 | 11/2017 |
| CN | 107688927 | 2/2018 |
| CN | 107820690 | 3/2018 |
| TW | 487851 | 5/2002 |
| TW | 201820241 | 6/2018 |

OTHER PUBLICATIONS

Readthedocs.io [online], "Hyperledger-fabric," Jun. 2018, retrieved on Sep. 18, 2019, retrieved from URL<https://hyperledger-fabric.readthedocs.io/en/release-1.4/index.html>, 41 pages.

Readthedocs.io [online], "Transactions," Feb. 2018, retrieved on Sep. 18, 2019, retrieved from URL<https://web3j.readthedocs.io/en/latest/transactions.html>, 11 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

| messageType | pubKey | contractID | methodName | parameters | extendInfo |
|---|---|---|---|---|---|

FIG. 5

BLOCKCHAIN-BASED SMART CONTRACT CALL METHODS AND APPARATUS, AND ELECTRONIC DEVICE

CROSS-REFERENCE TO RELATED APPLICATIONS

This application claims priority to Chinese Patent Application No. 201810713426.X, filed on Jun. 29, 2018, which is hereby incorporated by reference in its entirety.

TECHNICAL FIELD

One or more implementations of the present specification relate to the field of blockchain technologies, and in particular, to blockchain-based smart contract call methods and apparatus, and an electronic device.

BACKGROUND

The blockchain technology, also referred to as the distributed ledger technology, is a new technology in which computing devices jointly participate in "accounting" and jointly maintain a complete distributed database. The blockchain technology is featured by decentralization, and publicity and transparency. In the blockchain technology, each computing device can participate in database recording, and data synchronization can be quickly implemented between computing devices. Because of these features, the blockchain technology has been widely applied in various fields.

SUMMARY

The present specification provides a blockchain-based smart contract call method. The method includes: receiving a target transaction initiated by a client device, where the target transaction is preconfigured with a call rule used to initiate a call for a smart contract; obtaining the call rule configured for the target transaction, and executing the obtained call rule to initiate a call for a target smart contract; and returning a call result to the client device when the call for the target smart contract is completed.

Optionally, the target transaction carries description information, and the description information is used to determine the call rule preconfigured for the target transaction; and the obtaining the call rule configured for the target transaction includes: determining, based on the description information, the call rule configured for the target transaction, and obtaining the determined call rule from a call rule set.

Optionally, the description information is a transaction type of the target transaction, and the call rule includes a supported transaction type; and the determining, based on the description information, the call rule configured for the target transaction includes: searching for a call rule whose supported transaction type matches the transaction type of the target transaction; and determining the identified call rule as the call rule configured for the target transaction.

Optionally, the call rule includes the target smart contract that needs to be called, a target smart contract method, and a call parameter; and the executing the obtained call rule to initiate a call for a target smart contract includes: executing the obtained call rule, and transferring the call parameter included in the call rule to the target smart contract method in the target smart contract included in the call rule, to initiate a call for the target smart contract method.

Optionally, the call rule further includes an authorized public key, and the target transaction further includes a signature submitted based on a private key held by the client device; and before the executing the obtained call rule to initiate a call for a target smart contract, the method further includes: performing authentication on the signature of the target transaction based on the authorized public key in the call rule; and if the signature authentication of the target transaction succeeds, executing the obtained call rule to initiate the call for the target smart contract.

Optionally, the returning a call result to the client device includes: calling a callback interface of the client device, using the call result as the call parameter, and transferring the call result to the client device.

Optionally, before the obtaining the call rule configured for the target transaction, and executing the obtained call rule to initiate a call for a target smart contract, the method further includes: in response to the received target transaction, returning a call prompt to the client device.

The present specification further provides a blockchain-based smart contract call apparatus. The apparatus includes: a receiving module, configured to receive a target transaction initiated by client device, where the target transaction is preconfigured with a call rule used to initiate a call for a smart contract; an execution module, configured to obtain the call rule configured for the target transaction, and execute the obtained call rule to initiate a call for a target smart contract; and a returning module, configured to return a call result to the client device when the call for the target smart contract is completed.

Optionally, the target transaction carries description information, and the description information is used to determine the call rule preconfigured for the target transaction; and the execution module is configured to: determine, based on the description information, the call rule configured for the target transaction, and obtain the determined call rule from a call rule set.

Optionally, the description information is a transaction type of the target transaction, and the call rule includes a supported transaction type; and the execution module is further configured to: search for a call rule whose supported transaction type matches the transaction type of the target transaction; and determine the identified call rule as the call rule configured for the target transaction.

Optionally, the call rule includes the target smart contract that needs to be called, a target smart contract method, and a call parameter; and the execution module is configured to: execute the obtained call rule, and transfer the call parameter included in the call rule to the target smart contract method in the target smart contract included in the call rule, to initiate a call for the target smart contract method.

Optionally, the call rule further includes an authorized public key, and the target transaction further includes a signature submitted based on a private key held by the client device; and the execution module is further configured to: before executing the obtained call rule to initiate the call for the target smart contract, perform authentication on the signature of the target transaction based on the authorized public key in the call rule; and if the signature authentication of the target transaction succeeds, execute the obtained call rule to initiate the call for the target smart contract.

Optionally, the returning module is configured to: call a callback interface of the client device, use the call result as the call parameter, and transfer the call result to the client device.

Optionally, the execution module is further configured to: before obtaining the call rule configured for the target transaction, and executing the obtained call rule to initiate the call for the target smart contract, in response to the received target transaction, return a call prompt to the client device.

The present specification further provides an electronic device, including: a processor; and a memory, configured to store a machine executable instruction, where the processor reads and executes the machine executable instruction stored in the memory and corresponding to blockchain-based smart contract call control logic, to: receive a target transaction initiated by a client device, where the target transaction is preconfigured with a call rule used to initiate a call for a smart contract; obtain the call rule configured for the target transaction, and execute the obtained call rule to initiate a call for a target smart contract; and return a call result to the client device when the call for the target smart contract is completed.

Based on the previous technical solutions, the call for the smart contract is completed by executing the call rule preconfigured for the target transaction initiated by the client device. In actual applications, the call rule can be flexibly configured based on the complexity of service logic in a service scenario, so that the service logic can be configured in a service scenario in which some conventional services are combined with a blockchain, thereby better supporting a complex service scenario.

BRIEF DESCRIPTION OF DRAWINGS

FIG. 5 is a structural diagram illustrating a call rule, according to an example implementation;

DESCRIPTION OF IMPLEMENTATIONS

In the field of blockchain technologies, generally, a smart contract can be deployed in a blockchain, and some execution programs related to service logic can be included in the smart contract, to combine some conventional services with the blockchain.

For example, in a typical service scenario, a smart contract used for online transfer can be deployed in a blockchain to combine a conventional online transfer service with the blockchain technology. As such, a user can initiate a call for the smart contract by using a client device to complete an online transfer between users.

In a related technology, a process in which a user initiates a call for a smart contract deployed in a blockchain is usually featured by asynchronous processing.

The asynchronous processing is a concept corresponding to synchronous processing. The synchronous processing means that an initiator can initiate a next call after a current call that is initiated has been executed completely and after a called party has returned a call result to a calling party.

The asynchronous processing means that a called party can immediately return a call prompt (for example, a call handling prompt) to a calling party before a current call is executed after being initiated, so that the calling party can continue to initiate a call without waiting.

For example, in actual applications, the user can submit a transaction to the smart contract deployed in the blockchain by using the client device, and initiate a call for the smart contract. After the transaction is received, a call handling prompt can be immediately returned to the client device before the call for the smart contract is processed. In this case, the client device obtains only a call feedback of the smart contract, but does not synchronously obtain a call result of the smart contract.

However, in actual applications, after the user initiates the call for the smart contract by using the client device, the user generally has a demand for synchronously obtaining the call result of the smart contract. An urgent to-be-resolved technical problem in the field of blockchain technologies is how to synchronously obtain a call result of a smart contact in time after a call for the smart contract is initiated when the call for the smart contract is an asynchronous processing process.

Figure 1:
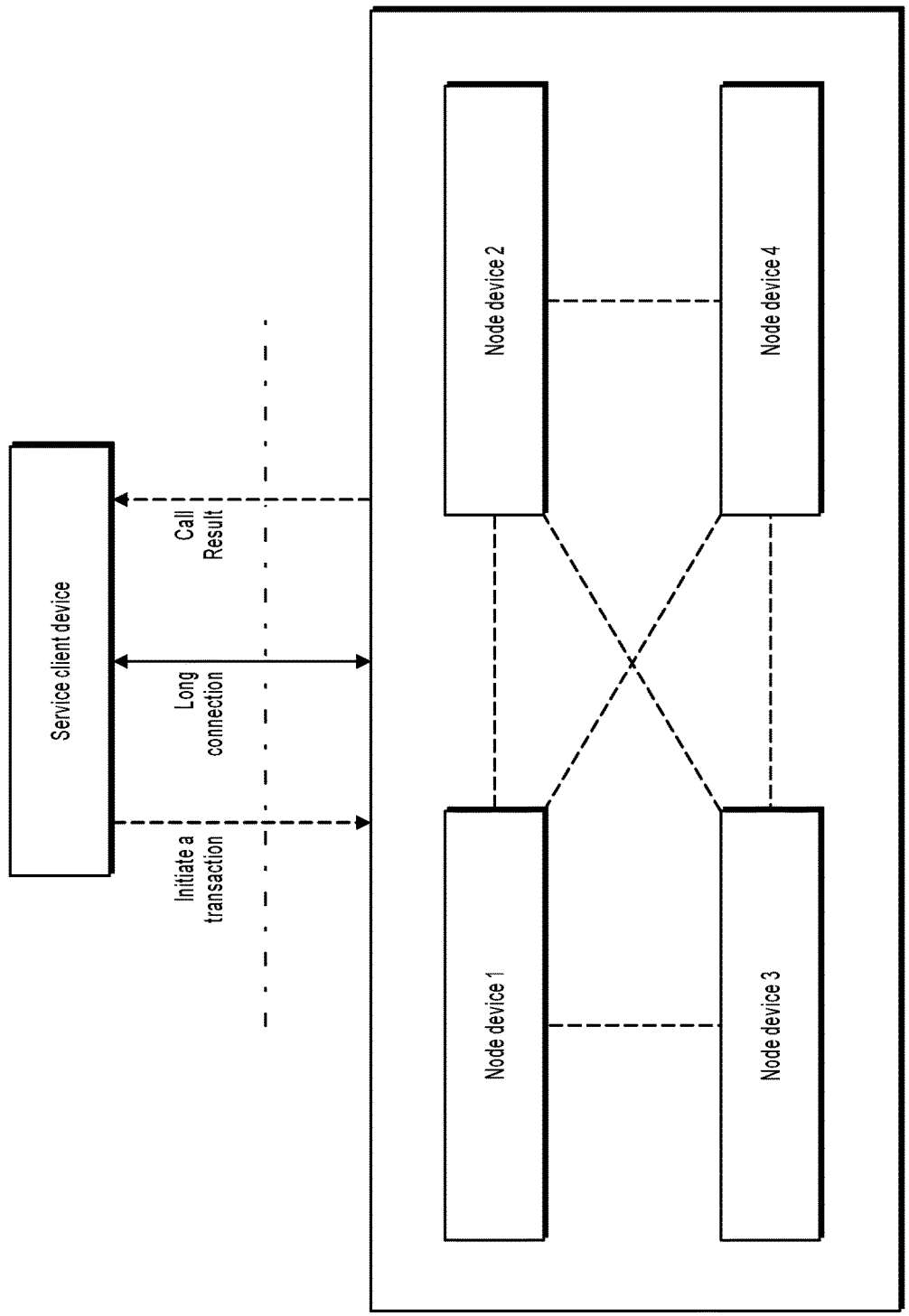
FIG. 1 is a schematic diagram illustrating a smart contract call mode, according to an example implementation.

FIG. 1 is a schematic diagram illustrating a smart contract call mode, according to the present specification.

In an implementation shown in the present specification, to ensure that a user can synchronously obtain a call result of a smart contract, a client device can use a synchronous wait mode based on a long connection to initiate a call for a smart contract.

As shown in FIG. 1, in this mode, a user client device can establish a long connection to a blockchain system when calling a smart contract deployed in a blockchain, and submit, to the smart contract through the long connection, a transaction used to initiate a call for the smart contract. The long connection needs to be constantly maintained in a smart contract call process. The client device can maintain the long connection and wait for the blockchain system to return a call result. After completing the call for the smart contract based on the transaction, the blockchain system can return the call result of the smart contract to the user client device through the long connection. The user client device can terminate the long connection after receiving the call result.

In the previous technical solution, in the mode of establishing a long connection, the user can synchronously obtain the call result after initiating, by using the client device, the call for the smart contract deployed in the blockchain. However, in this mode, a long connection needs to be maintained for each transaction initiated by the client device, and the client device needs to wait for the blockchain system to return a call result. Therefore, the client device actually serially processes the transactions, which severely occupies a computing resource of the client device, thereby causing a low service throughput. In other words, this mode cannot be applied to some highly concurrent service scenarios.

Figure 2:
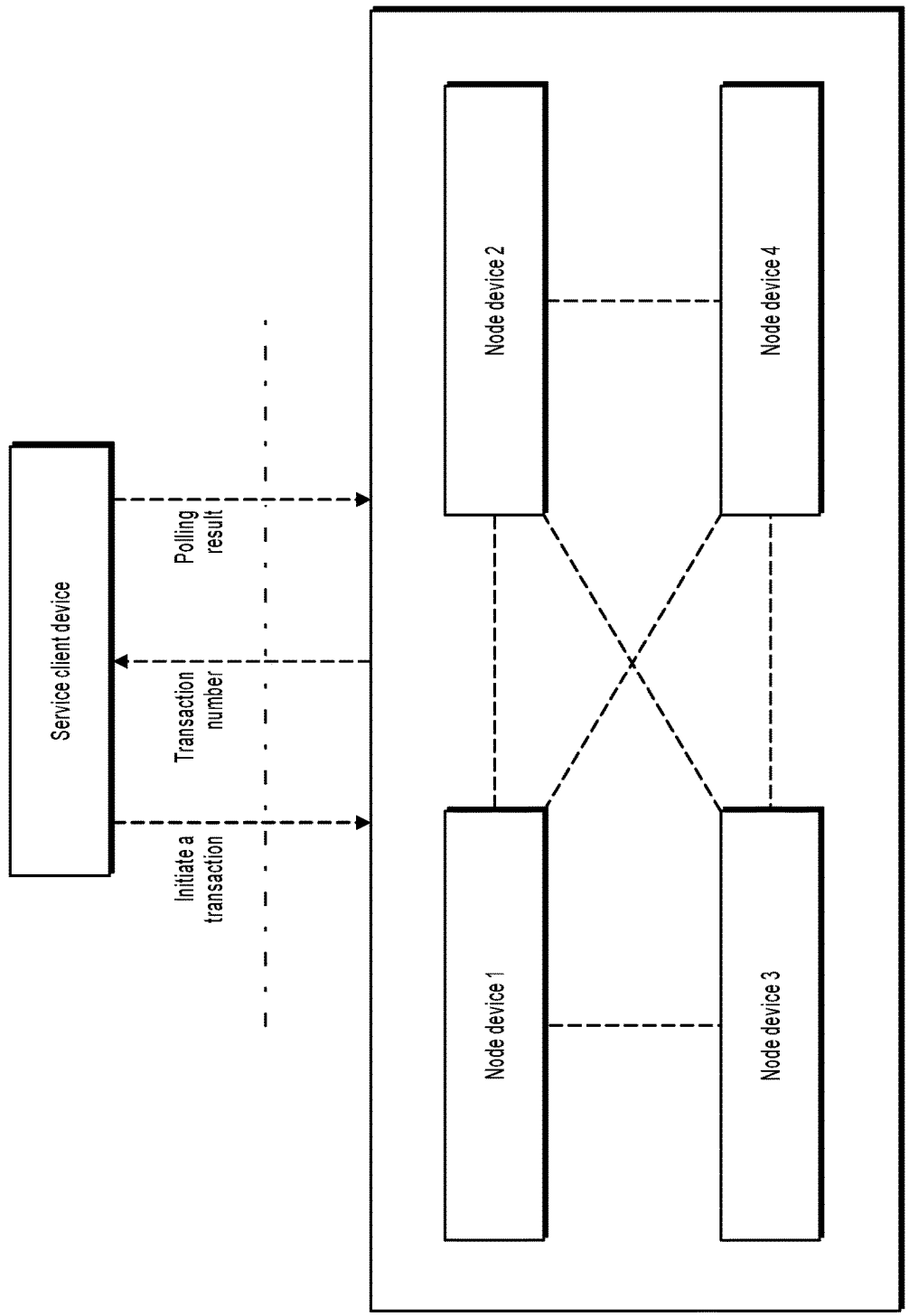
FIG. 2 is a schematic diagram illustrating another smart contract call mode, according to an example implementation.

FIG. 2 is a schematic diagram illustrating another smart contract call mode, according to the present specification.

In an implementation shown in the present specification, to ensure that a user can synchronously obtain a call result of a smart contract, a client device can use a call result mode based on an asynchronous poll to initiate a call for a smart contract.

As shown in FIG. 2, in this mode, a long connection no longer needs to be maintained between a client device and a blockchain system. When calling a smart contract deployed in a blockchain, the client device can establish a temporary connection to the blockchain system, and submit, to the smart contract through the temporary connection, a transaction used to initiate a call for the smart contract. After receiving the transaction, the smart contract can number the transaction, use a transaction number as a call feedback, and immediately return the number to the client device. Subsequently, the client device can asynchronously initiate a poll to the blockchain system based on the returned transaction number to actively query a call result.

In the previous technical solution, because the long connection no longer needs to be maintained between the client device and the blockchain system, a problem of serially processing transactions in the mode shown in FIG. 1 does not exist. However, the asynchronous poll used by the client device requires high consumption of the performance of the service client device. In addition, a quantity of poll times is difficult to control. As a result, it brings uncertainties in implementing service processing logic of the client device.

In view of this, the present specification further proposes an asynchronous call mode of configuring a call rule for a transaction and executing the call rule.

During implementation, a call rule used to initiate a call for a smart contract can be preconfigured for a transaction initiated by the client device.

For example, in an implementation, an ID of the smart contract that can be called for the transaction, a smart contract method in the smart contract that can be called, a call parameter that needs to be transferred when the smart contract method is called, etc. can be included in the previous call rule.

Further, after receiving the transaction initiated by the client device, a node device in the blockchain can obtain the call rule configured for the transaction and then execute the obtained call rule to initiate a call for a target smart contract.

For example, in an implementation, the ID of the smart contract that can be called for the transaction, the smart contract method in the smart contract that can be called, the call parameter that needs to be transferred when the smart contract method is called, etc. can be included in the previous call rule. The node device in the blockchain can execute the previous call rule and transfer the call parameter included in the call rule to the target smart contract method in the target smart contract included in the call rule, to initiate the call for the target smart contract method.

Afterwards, the node device can return the call result to the client device when the call for the target smart contract is completed. For example, the node device calls a callback interface of the client device, uses a call result as a call parameter, and returns the call result to the client device.

Based on the previous technical solutions, the call for the smart contract is completed by executing the call rule preconfigured for the target transaction initiated by the client device. In actual applications, the call rule can be flexibly configured based on the complexity of service logic in a service scenario, so that service logic can be configured in a service scenario in which some conventional services are combined with a blockchain, thereby better supporting a complex service scenario.

The following describes the present specification by using implementations with reference to application scenarios.

Figure 3:
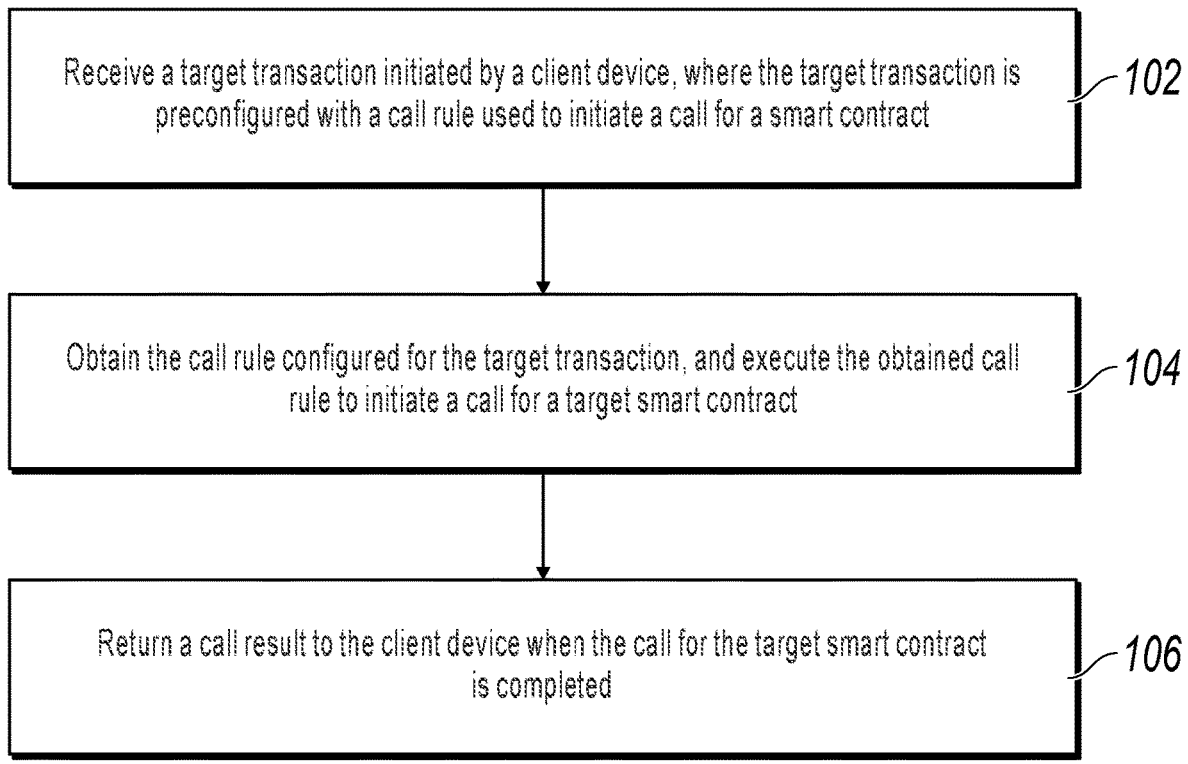
FIG. 3 is a flowchart illustrating a blockchain-based smart contract call method, according to an example implementation.

FIG. 3 shows a blockchain-based smart contract call method, according to an implementation of the present specification. The method is applied to a node device in a blockchain, including the following steps:

Step 302: Receive a target transaction initiated by a client device, where the target transaction is preconfigured with a call rule used to initiate a call for a smart contract.

Step 304: Obtain the call rule configured for the target transaction, and execute the obtained call rule to initiate a call for a target smart contract.

Step 306: Return a call result to the client device when the call for the target smart contract is completed.

The blockchain described in the present specification can specifically include any type of blockchain network. For example, in actual applications, the blockchain can be any one of a private blockchain, a public blockchain, or a consortium blockchain.

The transaction described in the present specification indicates a piece of data that is created by a user by using a client device of a blockchain and that needs to be finally released to a distributed database of the blockchain.

A transaction in a blockchain can be classified as a transaction in a narrow sense and a transaction in a broad sense. The transaction in a narrow sense indicates a value transfer released by the user to the blockchain. For example, in a conventional bitcoin blockchain network, the transaction can be a transfer initiated by the user in the blockchain. The transaction in a broad sense indicates service data with a service intention that is released by the user to the blockchain. For example, an operator can create a consortium blockchain based on an actual service demand, and deploy other types of online services (such as a rental service, a vehicle scheduling service, an insurance service, a credit service, and a medical service) irrelevant to a value transfer based on the consortium blockchain. In this type of consortium blockchain, the transaction can be a service message or a service request with a service intention that is released by the user in the consortium blockchain.

The target transaction is a call message or a call request created by the user by using the client device and used to initiate a call for a smart contract deployed in the blockchain.

Figure 4:
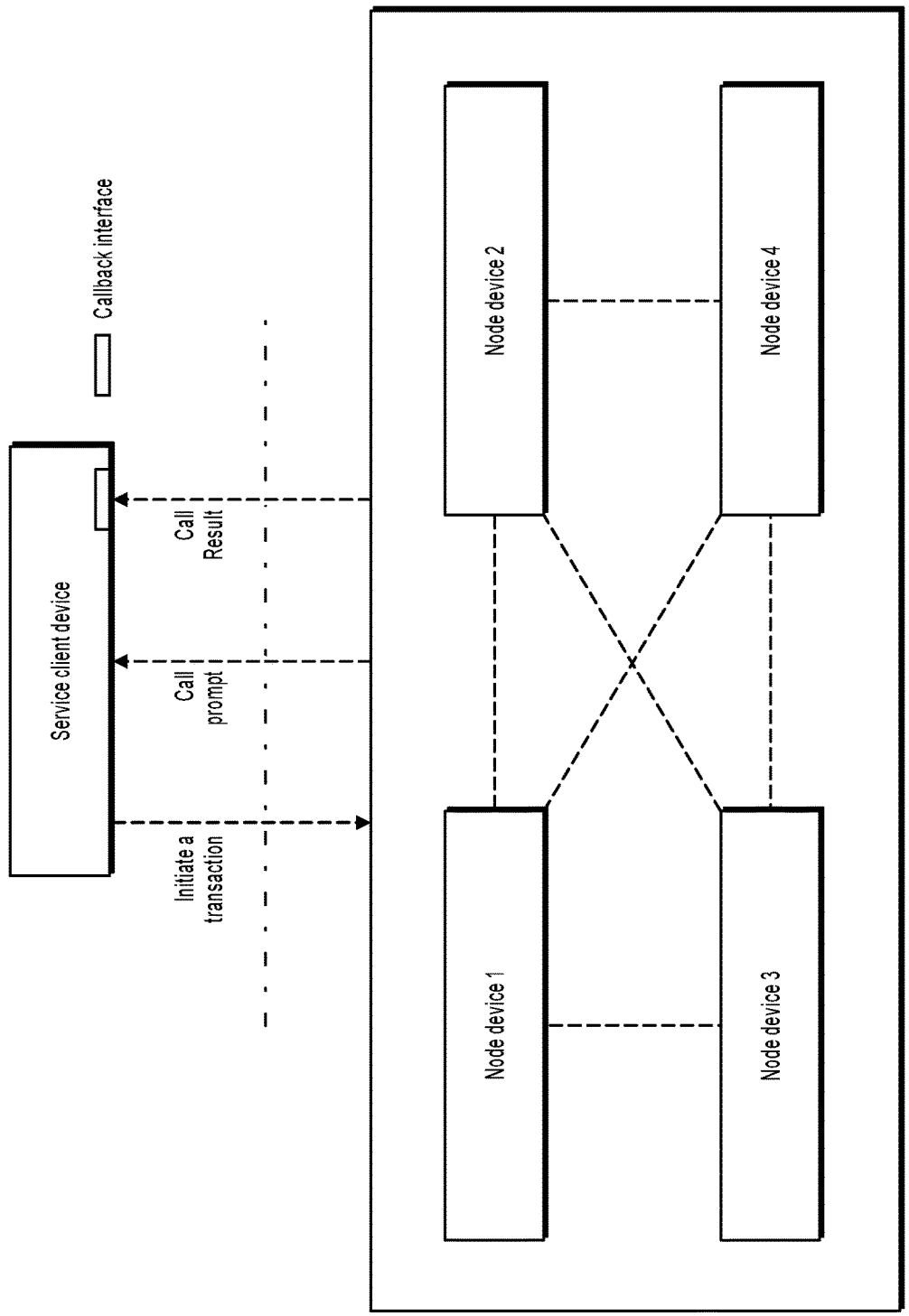
FIG. 4 is a schematic diagram illustrating another smart contract call mode, according to an example implementation.

FIG. 4 is a schematic diagram illustrating another smart contract call mode, according to the present specification.

In an initial state, an operator of a blockchain combines some conventional services with the blockchain.

In this case, a smart contract can be deployed in the blockchain, and an execution program related to actual service logic is included in the smart contract. For example, smart contract methods that can be called and executed are included in the smart contract and form a method set.

An implementation process of deploying the smart contract in the blockchain is not described in detail in the present specification.

For example, in actual applications, the operator of the blockchain can access any node device in the blockchain by using the client device and release completed smart contract code in the blockchain. The node device in the blockchain performs consensus processing. After obtaining consensus, the developed smart contract code is recorded and stored in a distributed database (in other words, a distributed ledger) of the blockchain for other users to call.

In addition, a call rule used to initiate a call for a smart contract can be preconfigured for a transaction initiated by the client device.

In a shown implementation, an ID of the smart contract that can be called for the transaction, a smart contract method in the smart contract that can be called, a call parameter that needs to be transferred when the smart contract method is called, etc. can be included in the previous call rule.

Based on this method, the call rule can be configured for the client device to flexibly initiate the transaction for the client device and specify a smart contract that needs to be called and a related smart contract method, thereby improving service flexibility.

For example, in a conventional call for a smart contract, when the user initiates the call for the smart contract by using the client device, an access address of the smart contract usually needs to be specified in the initiated transaction. In other words, in the conventional call for the smart contract, the user can initiate only a call for a specified smart contract by using the client device. In the present specification, because the smart contract that needs to be called for the transaction is completely specified in the call rule configured for the transaction, the transaction may not need to carry the access address of the smart contract that needs to be called. Therefore, the operator of the blockchain can update the call rule configured for the transaction to flexibly adjust the smart contract that can be called for the transaction, and further flexibly adjust service execution logic that can be triggered by the transaction.

Besides the ID of the smart contract that can be called for the transaction, the smart contract method in the smart contract that can be called, the call parameter that needs to be transferred when the smart contract method is called, etc. can be included in the call rule. In actual applications, other forms of information can be further introduced into the previous call rule based on an actual service demand.

In a shown implementation, when the call rule is configured for the transaction initiated by the client device, call rules can be configured for different types of transactions based on differences in the transaction types.

For example, different call rules can be configured for different types of transactions so that different smart contracts or different smart contract methods included in the same smart contract can be called for different types of transactions. As such, different service execution logic can be called for different types of transactions. Alternatively, different call rules can be configured for the same type of transaction so that different smart contracts or different smart contract methods included in the same smart contract can be called for this type of transaction, to call and trigger different service execution logic.

In this case, the previous call rule can further include a transaction type supported by the call rule.

Some client devices without smart contract call permission can initiate the call for the deployed smart contract. To avoid this case, in another shown implementation, a permission management means can be added to the call rule, and an authorized public key can be carried in the call rule, to ensure that only a client device holding a private key corresponding to the authorized public key can initiate the call for the smart contract.

FIG. 5 is a structural diagram illustrating a call rule, according to the present specification.

In a shown implementation, the call rule can include the following fields:

A message type field (messageType), which is used to record a message type supported by the call rule.

An authorized public key field (pubKey), which is used to record an authorized public key supported by the call rule.

A smart contract ID field (contractID), which is used to record an ID of a smart contract that can be called for a transaction included in the call rule. The smart contract ID field can record one or more smart contract IDs.

A smart contract method field (methodName), which is used to record a smart contract method that can be called and that is included in the call rule. The smart contract method in the field is one or more smart contract methods in the smart contract indicated by the smart contract ID included in the previous smart contract ID field.

A call parameter field (parameters), which is used to record a call parameter that needs to be transferred to the smart contract method when the smart contract method included in the previous smart contract method field is called.

An extension field (extendInfo), which is used to record service extension information that needs to be included in the call rule. A type of the extension information recorded in the previous extension field is not particularly limited in the present specification. A person skilled in the field can configure based on an actual service demand. For example, the extension information recorded in the previous extension field can be a request time stamp corresponding to a moment at which the client device initiates a transaction.

The technical solutions of the present specification are described in the following by using an example that the call rule has the structure shown in FIG. 5.

In the present specification, a user can perform a specified call operation on a client device to initiate a call for a smart contract deployed in a blockchain. A type of the call operation performed by the user on the client device is not particularly limited in the present specification.

For example, the user completes a cross-border transfer by calling a smart contract deployed in a blockchain. In a user interface of the previous client device, a "transfer button" used to trigger the cross-border transfer can be provided for the user. In this case, the previous specified call operation can be a trigger operation (for example, a click operation) corresponding to the previous "transfer button".

After detecting the call operation performed by the user, the client device can create a target transaction used to initiate a call for the smart contract and then submit the target transaction to an accessed node device.

In a shown implementation, the target transaction created by the client device can carry description information used to determine a call rule preconfigured for the target transaction.

After receiving the target transaction, the node device can immediately respond to the target transaction and return a call prompt to the client device. It is worthwhile to emphasize that the call prompt returned by the node device to the previous client device is not a final call result but a call feedback returned by a called party to a calling party in an asynchronous processing mechanism. For example, in actual applications, the call prompt can be a call handling prompt. For example, the call prompt can be a text prompt "You have successfully initiated the XX contract. Please wait for a result returned for the contract".

In addition, the node device can obtain the description information from the target transaction, determine, based on the obtained description information, the call rule configured for the target transaction, and then obtain, from a locally configured call rule set, the call rule configured for the target transaction.

Still referring to FIG. 5, for example, call rules are configured for different types of transactions based on differences in the transaction types. In this scenario, the previous description information can be transaction type information recorded in a transaction type field in the transaction.

In this case, the node device can read transaction type information from the target transaction and then search the call rule set for a call rule whose supported transaction type matches the transaction type of the target transaction. After the call rule whose supported transaction type matches the transaction type of the target transaction is identified in the previous call rule set, the identified call rule is a call rule preconfigured by an operator of the blockchain for the target transaction, and the node device can obtain the identified call rule from the previous call rule set.

In the present specification, based on a private key held by the client device, a signature is usually signed on the target transaction initiated by the user by using the client device. After receiving the target transaction, the node device can perform authentication on the signature of the target transaction based on a public key corresponding to the private key held by the client device to complete an identity authentication process of the transaction initiator. In addition, after obtaining, from the locally configured call rule set, the call rule configured for the target transaction, the node device can further perform authentication on the signature of the target transaction based on an authorized public key recorded in an authorized public key field in the call rule.

If the signature authentication of the target transaction based on the previous authorized public key succeeds, it indicates that the client device is an authorized client device with smart contract call permission. In this case, the node device can further execute the call rule obtained from the previous call rule set.

Otherwise, if the signature authentication of the target transaction based on the previous authorized public key fails, it indicates that the client device does not have smart contract call permission. In this case, the node device may no longer execute the call rule obtained from the previous call rule set and discard the target transaction initiated by the client device.

Based on this method, not only an invalid transaction initiated by some client devices without the smart contract call permission can be effectively filtered out, but also a call security level of a smart contract can be improved, thereby rejecting an unauthorized call of some unauthorized client devices without the call permission.

In a shown implementation, when the node device executes the call rule preconfigured for the target transaction to initiate the call for the smart contract, first, the node device can read information recorded in the smart contract ID field, the smart contract method field, and the call parameter field in the previous call rule; then, the node device can further confirm the target smart contract indicated by the smart contract ID recorded in the smart contract ID field and find the target smart contract method recorded in the smart contract method field from the smart contract; and finally, the node device can transfer the call parameter recorded in the call parameter field to the identified target smart contract method and initiate a call for the target smart contract method.

For example, a smart contract is called for a target transaction to complete a transfer. In this scenario, the call rule configured for the target transaction can be represented by using the following character string code: sys.0xb288a.0xd7fd0.remit.A_B_USD_10.1522157079.

A structure of the previously shown call rule corresponds to the structure of the call rule shown in FIG. 5. Here, "." indicates a delimiter between fields; sys identifies that a transaction type supported by the call rule is a system transaction; 0xb288a is an authorized public key supported by the call rule; 0xd7fd0 is an ID of the smart contract that needs to be executed for the transaction included in the previous call rule; remit is a smart contract method that needs to be called and executed and that is included in the previous call rule; (A_B_USD_10) is a call parameter that needs to be transferred, indicating that A transfers 10 dollars to B; 1522157079 indicates a request time stamp corresponding to a moment of initiating the previous target transaction.

A complete meaning of the previously shown call rule is that the call rule is applied to a system transaction initiated by a client device whose public key is 0xb288a. The call parameter (A_B_USD_10) is transferred to the remit method in the smart contract 0xd7fd0 to complete the online transfer.

It is worthwhile to note that, in actual applications, in addition to an accurate character string, a wildcard character can also be used for representation in a character string coding scheme used in the previous call rule.

For another example, a smart contract is called for a target transaction to complete a transfer. In this scenario, the call rule configured for the target transaction can be represented by using the following character string code: sys.0xb288a.0xd7fd0.*.A_B_USD_10.1522157079.

A complete meaning of the previously shown call rule is that the call rule is applied to all system transactions initiated by a client device whose public key is 0xb288a. The call rule is executed. The call parameter (A_B_USD_10) can be transferred to all execution methods (to be specific, wildcard characters are used to represent all execution methods included in the smart contract 0xd7fd0) included in the smart contract to complete the online transfer.

It can be seen that the call rule can be flexibly mapped to different service processing logic by introducing the wildcard character, to better support an upper layer service.

For example, in actual applications, the same call rule can be configured for different types of transactions by introducing the wildcard character, and the different types of transactions can be mapped to the same service processing logic. For example, the same call rule is configured for different types of transactions to ensure that the same execution method included in the same smart contract can be called for different types of transactions to trigger corresponding service processing logic.

Still referring to FIG. 4, in the present specification, the client device can further provide a callback (callback) interface for a node device in a blockchain. For example, an SPI interface for the blockchain can be developed on the previous client device.

When the node device completes the previously shown smart contract call process, the node device can immediately respond to the smart contract call complete event, call the callback interface, use a call result of the target smart contract as the call parameter, and transmit the call result to the client device.

Based on this method, because a long connection does not need to be maintained between the client device and the blockchain system, a problem of serially processing transactions does not exist. In addition, the smart contract call process shown in the present specification is still an asynchronous processing process. That is, after receiving the transaction submitted by the client device, the node device first returns a call prompt and then actively returns the call result by calling the callback interface of the client device. As such, the technical solutions in the present specification are applicable to some highly concurrent service scenarios.

Figure 6:
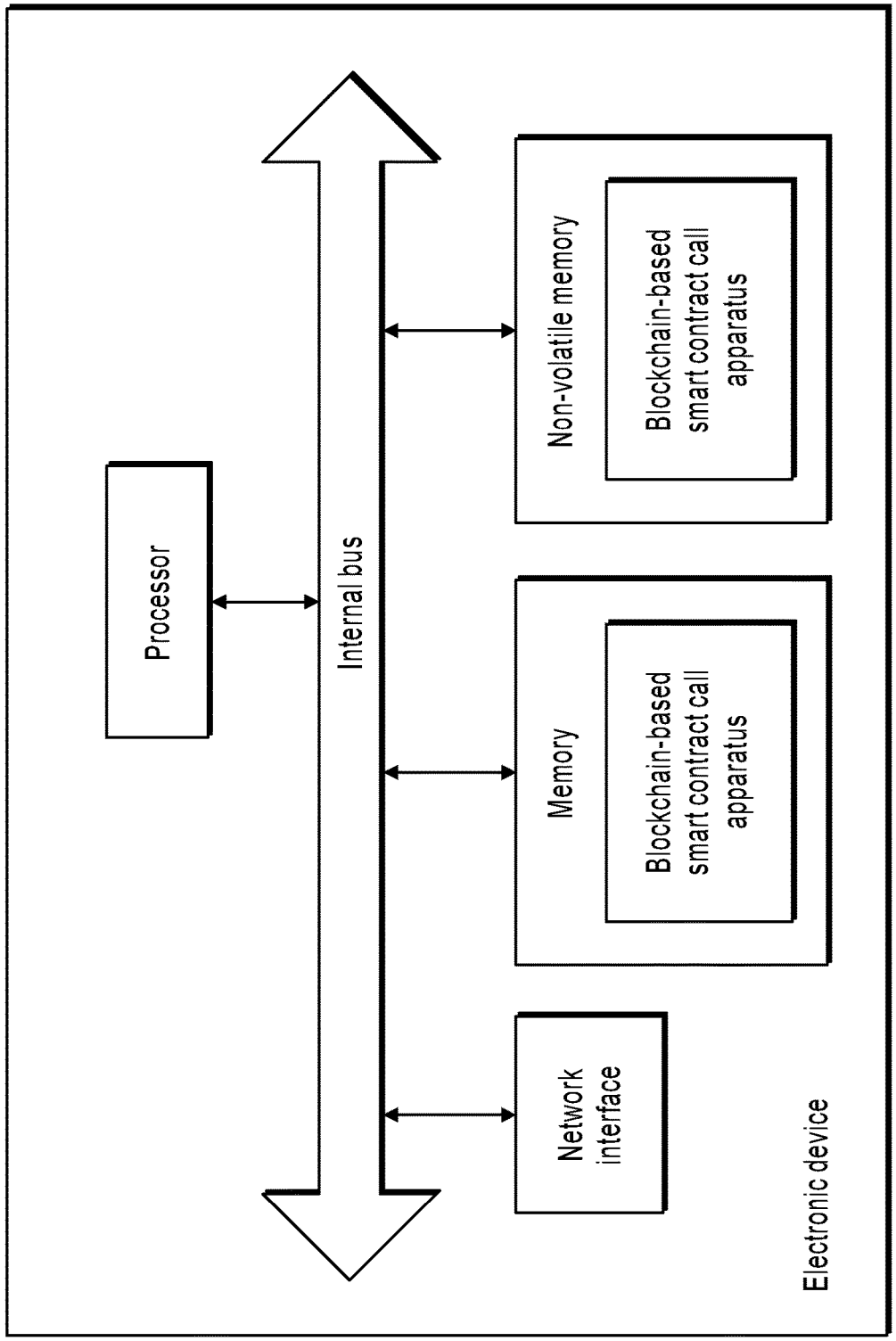
FIG. 6 is a schematic structural diagram illustrating an electronic device, according to an example implementation.

The present specification further provides a blockchain-based smart contract call apparatus implementation corresponding to the previous method implementation. Implementations of the blockchain-based smart contract call apparatus in the present specification can be applied to an electronic device. The apparatus implementation can be implemented by software, hardware, or a combination of hardware and software. Software implementation is used as an example. As a logical apparatus, the apparatus is formed by reading a corresponding computer program instruction in a non-volatile memory to a memory by a processor of an electronic device in which the apparatus is located. In terms of hardware, referring to FIG. 6, FIG. 6 is a hardware structural diagram illustrating an electronic device in which the blockchain-based smart contract call apparatus is located in the present specification. In addition to a processor, a memory, a network interface, and a non-volatile memory shown in FIG. 6, the electronic device in which the apparatus is located in the implementations can usually include other hardware based on an actual function of the electronic device. Details are omitted here for simplicity.

Figure 7:
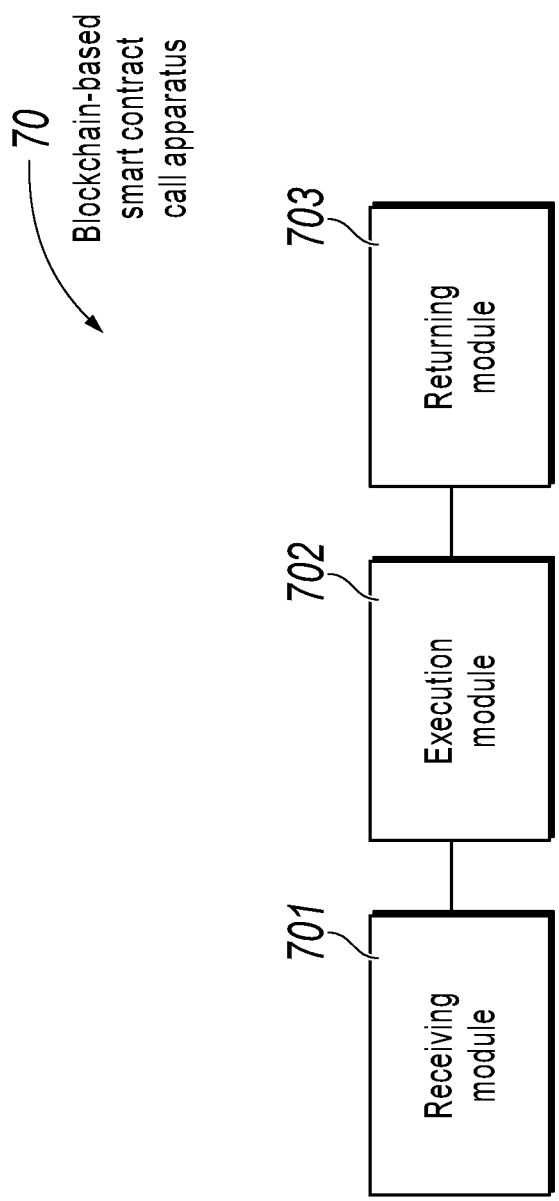
FIG. 7 is a block diagram illustrating a blockchain-based smart contract call apparatus, according to an example implementation.

FIG. 7 is a block diagram illustrating a blockchain-based smart contract call apparatus, according to an example implementation of the present specification.

Referring to FIG. 7, the blockchain-based smart contract call apparatus 70 can be applied to the electronic device shown in FIG. 3, and includes a first acquisition module 701, a determining module 702, a second acquisition module 703, and a verification module 704.

The first acquisition module 701 is configured to obtain a data identifier of target data released by a data provider in a blockchain. The data identifier indicates a storage location of the target data in the blockchain.

The determining module 702 is configured to determine, based on the data identifier, whether the target data has been stored in the blockchain.

The second acquisition module 703 is configured to: if the target data has been stored in the blockchain, obtain the target data at the storage location indicated by the data identifier. The target data stored in the blockchain carries verification information used to verify the authenticity of the target data.

The verification module 704 is configured to verify the authenticity of the obtained target data based on the verification information and output a verification result to a data verifier.

In the present implementation, the target data released by the data provider carries graphic code generated based on the data identifier.

The first acquisition module 701 is configured to scan and parse the graphic code to obtain the data identifier of the target data in the blockchain.

In the present implementation, the data identifier is a transaction hash value of a transaction including the target data.

The determining module 702 is configured to perform SPV verification on the transaction based on the transaction hash value of the transaction including the target data to determine whether the transaction has been stored in the blockchain.

In the present implementation, the verification module 704 is configured to execute a mounted verification program and verify the authenticity of the obtained target data based on the verification information; or call a smart contract released in the blockchain, execute a verification program included in the smart contract, and verify the authenticity of the obtained target data based on the verification information.

In the present implementation, the target data stored in the blockchain further includes auxiliary information related to the authenticity verification, and the verification information is a hash value obtained by performing hash calculation based on original content of the target data and the auxiliary information.

The verification module 704 is further configured to perform hash calculation based on the original content of the target data and the auxiliary information to obtain the hash value; determine whether the calculated hash value is the same as the hash value carried in the target data stored in the blockchain; and if yes, determine that the authenticity verification of the obtained target data succeeds; or if not, determine that the authenticity verification of the obtained target data fails.

In the present implementation, the auxiliary information includes a combination of any one or more of an identity of a data uploading party; a time stamp of uploading the target data; and a location of uploading the target data.

In the present implementations, the second acquisition module 703 is further configured to output, to the data verifier, the target data obtained at the storage location indicated by the data identifier, so that the data verifier compares the output target data with the target data released by the data provider.

For an implementation process of functions and roles of modules in the apparatus, references can be made to an implementation process of a corresponding step in the previous method. Details are omitted here for simplicity.

An apparatus implementation basically corresponds to a method implementation. For related parts, reference can be made to related descriptions in the method implementation. The previously described apparatus implementation is merely an example. The modules described as separate components may or may not be physically separate, and components displayed as modules may or may not be physical modules, in other words, may be located in one position or may be distributed on a plurality of network modules. Some or all of the modules can be selected based on actual demands to achieve the objectives of the solutions of the present specification. A person of ordinary skill in the field can understand and implement the solutions of the present specification without creative efforts.

The system, apparatus, module, or unit illustrated in the previous implementations can be implemented by using a computer chip or an entity, or can be implemented by using a product having a certain function. A typical implementation device is a computer. The computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The present application further provides an electronic device implementation corresponding to the previous method implementation. The electronic device includes a processor and a memory configured to store a machine executable instruction. The processor and the memory are generally connected to each other by using an internal bus. In another possible implementation, the device can further include an external interface to communicate with another device or component.

In the present implementation, the processor reads and executes the machine executable instruction stored in the memory and corresponding to blockchain-based smart contract call control logic, to: obtain a data identifier of target data released by a data provider in a blockchain, where the data identifier indicates a storage location of the target data in the blockchain; determine, based on the data identifier, whether the target data has been stored in the blockchain; if the target data has been stored in the blockchain, obtain the target data at the storage location indicated by the data identifier, where the target data stored in the blockchain carries verification information used to verify the authenticity of the target data; and verify the authenticity of the obtained target data based on the verification information and output a verification result to a data verifier.

In the present implementation, the target data released by the data provider carries graphic code generated based on the data identifier.

The processor reads and executes the machine executable instruction stored in the memory and corresponding to the blockchain-based smart contract call control logic, to: scan and parse the graphic code to obtain the data identifier of the target data in the blockchain.

In the present implementation, the data identifier is a transaction hash value of a transaction including the target data.

The processor reads and executes the machine executable instruction stored in the memory and corresponding to the blockchain-based smart contract call control logic, to: perform SPV verification on the transaction based on the transaction hash value of the transaction including the target data, to determine whether the transaction has been stored in the blockchain.

In the present implementation, the processor reads and executes the machine executable instruction stored in the memory and corresponding to the blockchain-based smart contract call control logic, to: execute a mounted verification program and verify the authenticity of the obtained target data based on the verification information; or call a smart contract released in the blockchain, execute a verification program included in the smart contract, and verify the authenticity of the obtained target data based on the verification information.

In the present implementation, the target data stored in the blockchain further includes auxiliary information related to the authenticity verification, and the verification information is a hash value obtained by performing hash calculation based on original content of the target data and the auxiliary information.

The processor reads and executes the machine executable instruction stored in the memory and corresponding to the blockchain-based smart contract call control logic, to: perform hash calculation based on the original content of the target data and the auxiliary information to obtain the hash value; determine whether the calculated hash value is the same as the hash value carried in the target data stored in the blockchain; and if yes, determine that the authenticity verification of the obtained target data succeeds; or if not, determine that the authenticity verification of the obtained target data fails.

In the present implementation, the processor reads and executes the machine executable instruction stored in the memory and corresponding to the blockchain-based smart contract call control logic, to: output, to the data verifier, the target data obtained at the storage location indicated by the data identifier, so that the data verifier compares the output target data with the target data released by the data provider.

A person skilled in the present field can easily figure out another implementation of the present specification after thinking over the present specification and practicing the present invention here. The present specification is intended to cover any variations, uses, or adaptations of the present specification. These variations, uses, or adaptations follow the general principles of the present specification and include common knowledge or conventional techniques that are not disclosed in the technical field of the present specification. The present specification and the implementations are merely considered as examples. The actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The previous descriptions are merely preferred implementations of the present specification, but are not intended to limit the present specification. Any modification, equivalent replacement, or improvement made without departing from the spirit and principle of the present specification shall fall within the protection scope of the present specification.

This specification describes techniques for synchronously obtaining a call result of a smart contact in time after a call for the smart contract is initiated, when the call for the smart contract is an asynchronous processing process. For example, after receiving the target transaction, the node device can immediately respond to the target transaction and return a call prompt to the client device. The call prompt may not be a final call result but may be a call feedback returned by the node device in an asynchronous processing mechanism. The call prompt may be provided to the client device to inform the client device that the client device should wait for the call result. In this way, the client device can synchronously obtain a call result of a smart contact after a call for the smart contract is initiated and when the call for the smart contract is processed asynchronously. Because a long connection does not need to be maintained, the use of computing resources is reduced. Additionally, since an asynchronous poll is not required, further computing resources of the client device need not be consumed.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for blockchain-based smart contract call, the computer-implemented method comprising:

receiving, by a node device of a blockchain, a target transaction initiated by a client device of the blockchain, wherein the target transaction comprises description information that identifies a call rule used to initiate a call for a smart contract, wherein the description information comprises a transaction type field, and wherein the call rule comprises a smart contract ID field specifying a smart contract identifier of the smart contract, a message type field specifying a supported transaction type that matches transaction type information in the transaction type field, and a smart contract method field specifying at least one smart contract method in the smart contract;

in response to receiving the target transaction, returning, by the node device, a call prompt to the client device, wherein the call prompt comprises call feedback that instructs the client device to wait for a call result;

obtaining, by the node device, the call rule for the target transaction;

executing, by the node device, the call rule to initiate a call for the smart contract, comprising:

reading the smart contract identifier of the smart contract from the smart contract ID field and reading the at least one smart contract method from the smart contract method field;

obtaining the smart contract based on the smart contract identifier and finding the at least one smart contact method in the smart contract; and initiating the call for the at least one smart contract method; and providing Flail, by the node device, the call result to the client device when the call for the smart contract is completed.

2. The computer-implemented method of claim 1, wherein obtaining the call rule for the target transaction comprises:

searching for the call rule whose supported transaction type matches the transaction type information; and determining the call rule as the call rule preconfigured for the target transaction.

3. The computer-implemented method of claim 1, wherein before executing the call rule to initiate the call for the smart contract, the method comprises:

performing authentication of a signature of the target transaction based on an authorized public key in the call rule, wherein the signature of the target transaction is based on a private key held by the client device;

determining that the authentication of the signature of the target transaction succeeds; and in response to determining that the authentication of the signature of the target transaction succeeds, executing the call rule to initiate the call for the smart contract.

4. The computer-implemented method of claim 1, wherein the call rule comprises a call parameter.

5. A non-transitory, computer-readable medium storing one or more instructions executable by a computer system to perform operations comprising:

receiving, by a node device of a blockchain, a target transaction initiated by a client device of the blockchain, wherein the target transaction comprises description information that identifies a call rule used to initiate a call for a smart contract, wherein the description information comprises a transaction type field, and wherein the call rule comprises a smart contract ID field specifying a smart contract identifier of the smart contract, a message type field specifying a supported transaction type that matches transaction type information in the transaction type field, and a smart contract method field specifying at least one smart contract method in the smart contract;

in response receiving the target transaction, returning, by the node device, a call prompt to the client device, wherein the call prompt comprises call feedback that instructs the client device to wait for a call result;

obtaining, by the node device, the call rule for the target transaction;

executing, by the node device, the call rule to initiate a call for the smart contract, comprising:

reading the smart contract identifier of the smart contract from the smart contract ID field and reading the at least one smart contract method from the smart contract method field;

obtaining the smart contract based on the smart contract identifier and finding the at least one smart contact method in the smart contract; and initiating the call for the at least one smart contract method; and providing, by the node device, the call result to the client device when the call for the smart contract is completed.

6. The non-transitory, computer-readable medium of claim 5, wherein obtaining the call rule for the target transaction comprises:

searching for the call rule whose supported transaction type matches the transaction type information; and determining the call rule as the call rule preconfigured for the target transaction.

7. The non-transitory, computer-readable medium of claim 5, wherein before executing the call rule to initiate the call for the smart contract, the operations comprising:

performing authentication of a signature of the target transaction based on an authorized public key in the call rule, wherein the signature of the target transaction is based on a private key held by the client device;

determining that the authentication of the signature of the target transaction succeeds; and in response to determining that the authentication of the signature of the target transaction succeeds, executing the call rule to initiate the call for the smart contract.

8. The non-transitory, computer-readable medium of claim 5, wherein the call rule comprises a call parameter.

9. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a node device of a blockchain, a target transaction initiated by a client device of the blockchain, wherein the target transaction comprises description information that identifies a call rule used to initiate a call for a smart contract, wherein the description information comprises a transaction type field, and wherein the call rule comprises a smart contract ID field specifying a smart contract identifier of the smart contract, a message type field specifying a supported transaction type that matches transaction type information in the transaction type field, and a smart contract method field specifying at least one smart contract method in the smart contract;

in response to receiving the target transaction, returning, by the node device, a call prompt to the client device, wherein the call prompt comprises call feedback that instructs the client device to wait for a call result;

obtaining, by the node device, the call rule for the target transaction;

executing, by the node device, the call rule to initiate a call for the smart contract, comprising:

reading the smart contract identifier of the smart contract from the smart contract ID field and reading the at least one smart contract method from the smart contract method field;

obtaining the smart contract based on the smart contract identifier and finding the at least one smart contact method in the smart contract; and initiating the call for the at least one smart contract method; and providing, by the node device, the call result to the client device when the call for the smart contract is completed.

10. The computer-implemented system of claim 9, wherein obtaining the call rule for the target transaction comprises:

searching for the call rule whose supported transaction type matches the transaction type information; and determining the call rule as the call rule preconfigured for the target transaction.

11. The computer-implemented system of claim 9, wherein before executing the call rule to initiate the call for the smart contract, the operations comprising:

performing authentication of a signature of the target transaction based on an authorized public key in the call rule, wherein the signature of the target transaction is based on a private key held by the client device;

determining that the authentication of the signature of the target transaction succeeds; and in response to determining that the authentication of the signature of the target transaction succeeds, executing the call rule to initiate the call for the smart contract.

* * * * *

UNITED STATES PATENT AND TRADEMARK OFFICE
CERTIFICATE OF CORRECTION

PATENT NO. : 11,005,844 B2
APPLICATION NO. : 16/456227
DATED : May 11, 2021
INVENTOR(S) : Jiyuan Wang and Xuebing Yan Page 1 of 1

It is certified that error appears in the above-identified patent and that said Letters Patent is hereby corrected as shown below:

In the Claims

Column 17, Line 20, in Claim 1, delete "providing Flail" and insert -- providing, --, therefor.

Column 17, Line 60, in Claim 5, after "response" insert -- to --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*